July 17, 1951          L. M. SILVA          2,560,748
AUTOMATIC HEADLIGHT DIMMING APPARATUS
Filed May 15, 1950
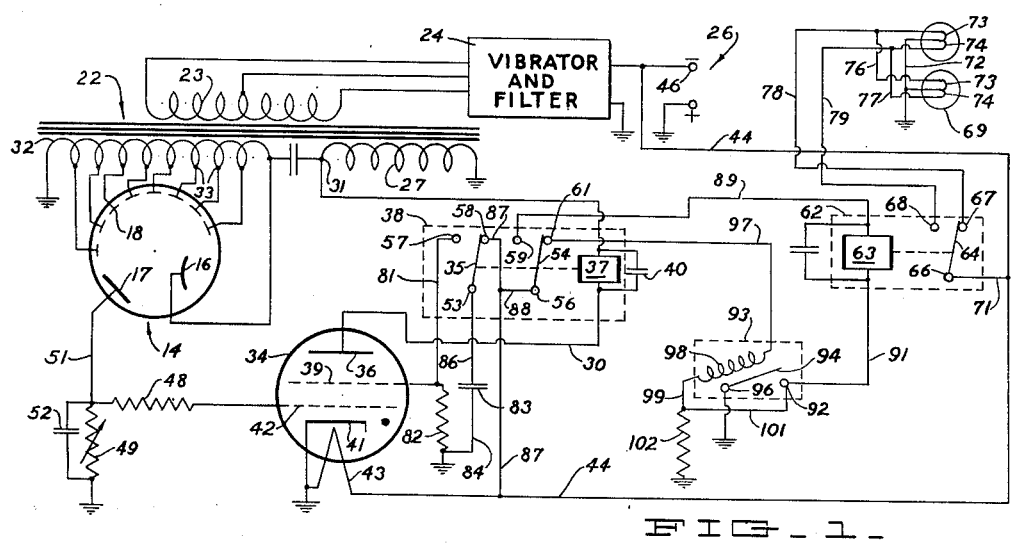
FIG_1_
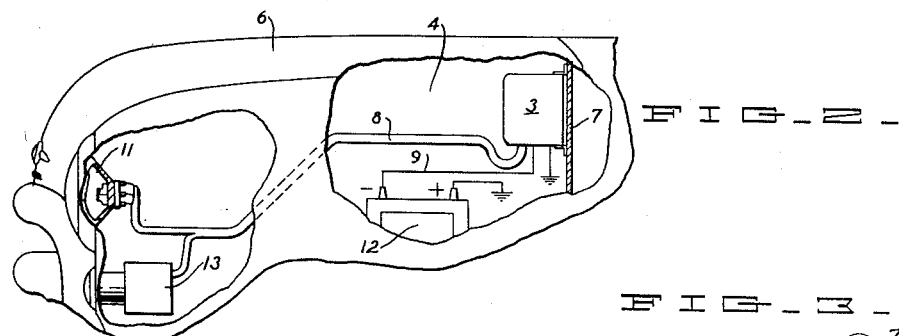
FIG_2_
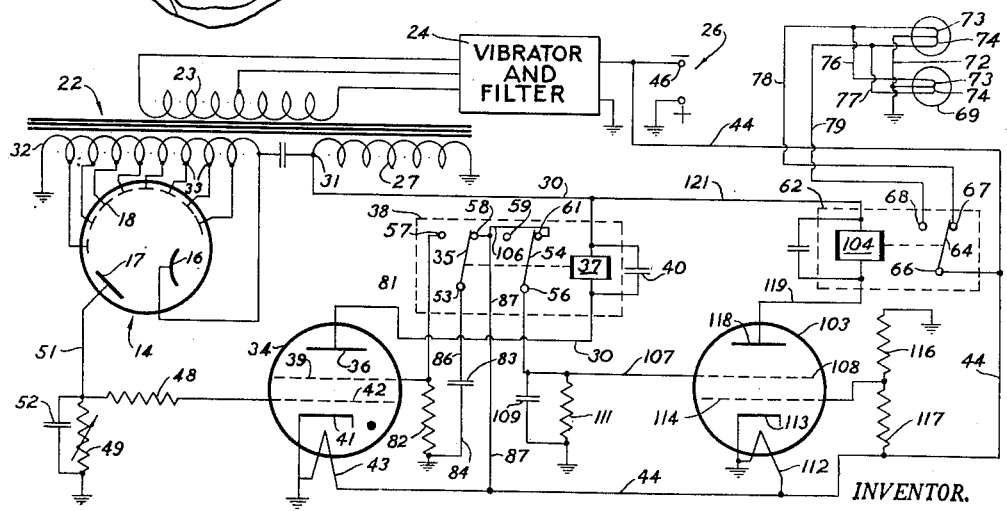
FIG_3_
INVENTOR.
LAWRENCE M. SILVA
BY Joseph B. Gardner
atty.

Patented July 17, 1951

2,560,748

UNITED STATES PATENT OFFICE 2,560,748

AUTOMATIC HEADLIGHT DIMMING APPARATUS

Lawrence M. Silva, Berkeley, Calif., assignor of one-third to John H. Janusch and one-third to Floyd C. Snyder, both of Richmond, Calif.

Application May 15, 1950, Serial No. 161,992

9 Claims. (Cl. 315—83)

This invention relates to apparatus for effecting the automatic control of multi-beam headlights.

An object of the invention is to provide apparatus of the class described which possesses sensitivity greatly in excess of that inherent in previously proposed devices of this character.

Another object of the invention is to provide apparatus of the class referred to which is operated and controlled by improved electronically actuated means.

A further object of the invention is to provide apparatus such as above described including improved time delay mechanism operative to compensate for differences in sensitivity or operational characteristics between the automatic dimming apparatus of relatively approaching similarly equipped vehicles so as to insure that an operative cycle is instituted in the less sensitive apparatus and to further insure against reestablishment of maximum brilliance in the headlight beams of one vehicle in the event that energizing illumination should be momentarily cut off from one of both control mechanisms due, for instance, to the beams of the approaching vehicle veering as a result of swerving of the latter vehicle or the encountering thereby of vertical irregularities in the road surface.

Still another object of the invention is to provide apparatus of the class described whose celerity of response is enhanced by the employment of improved thermally-biased circuit control devices.

A still further object of the invention is to provide apparatus forming part of the headlight beam control mechanism of a first vehicle and including a novel arrangement of circuit governing devices capable of initial excitation by luminosity from the high range headlight beams of a distantly approaching second vehicle, which is also capable of retarding the diminution of intensity of the headlight beams of the first vehicle until such time as it is reasonably assured that the similar control mechanism of the second vehicle has been initially excited by the high range beams of the first vehicle, and which is further capable, after diminution of the bright beams of the first vehicle, of introducing operational delay in the control circuit of the mechanism of the first vehicle tending to restrain return of the headlight beams of the first vehicle to high range until the degree of luminosity from the diminished beams of the second vehicle has become great enough, due to relative approach of the vehicles to maintain the mechanism of the first vehicle in a state of excitation.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to the drawing:

Figure 1 is a schematic diagram showing the electrical connections between the various components of the preferred apparatus of my invention.

Figure 2 is a side elevational view of portion of an automobile, sections of the latter being broken away so as to show a typical installation of the apparatus of my invention therein.

Figure 3 is a portional circuit diagram showing modified means for obtaining delayed operational action in the control apparatus of my invention.

Numerous devices have been previously proposed for electronically and electro-mechanically controlling the multi-beam headlights of automotive vehicles so as to effect automatic depression of the maximum range beams of such headlights or to otherwise diminish the light intensity when two or more vehicles come into proximate range of each other wherein the bright lights might temporarily blind the respective vehicle operators and create a dangerous driving hazard. Most of the above devices use conventional photoelectric cells as the light detector elements thereof and are provided with thermionic amplifiers capable of magnifying the faint signal current to a degree where actuation of relays may be effected for directly controlling the headlight dimmer switch to depress or reestablish the long range beams of the lights. Numerous disadvantages are inherent in the above-mentioned devices. Foremost among these is the incapability of apparatus of inferior sensitivity in one vehicle to function as rapidly, or at the same range, as a more sensitive apparatus in a frontally approaching vehicle. This may result in desirable prompt depression or dimming of the light beams of the latter vehicle but since this greatly lowers the light intensity impinging on the detector element of the first vehicle, the inefficient control apparatus thereof may not function until the two vehicles have approached within very close range during which time the operator of the second vehicle will have been subjected to the annoying and blinding glare. In some instances, if the relative speed of the two vehicles is quite high, the vehicle bearing the less efficient control apparatus may completely pass the other vehicle without the former having dimmed its lights. There is also the possibility that even though the headlights of both vehicles may have been properly dimmed, a veering of one vehicle toward the road shoulder or if a rise or depression in the road surface may be encountered, which would momentarily reduce the light intensity on the detector elements of the latter or both vehicles, the control apparatus of at least the approaching vehicle may possibly become deactivated and prematurely flash on the said vehicle's long range beams. Another decided disadvantage in the foregoing types of apparatus is their tendency, when a spaced file of oncoming vehicles is encountered, to momentarily flash the high beams of a vehicle passing oppositely along the file on and off as each darkened space between successive vehicles in the file is approached. This can create an exceedingly dangerous driving hazard for the drivers exposed to such flashing.

I have provided apparatus which not only greatly exceeds the ultimate sensitivity range of comparable devices excited by conventional photocell units or tubes but is also capable of novel delayed action so as to compensate for possible reduced sensitivity of apparatus in approaching vehicles and to overcome the aforementioned objectionable tendency toward periodic restoration of maximum brightness in the headlight beams whenever, due to the above causes, light intensity on the photoelectric detector may momentarily decrease. As shown in Figure 2, the entire apparatus of my invention may be housed in a comparatively small casing 3, suitably mounted within the engine compartment 4 of the vehicle 6 preferably on the back of the fire wall 7 and connected through suitable cables 8 and conductor 9 with the vehicle headlights 11 and battery 12 respectively. The induction tube or port 13 through which incident rays from the headlights of an approaching vehicle may be admitted to actuate the photoelectric detector of the apparatus may be positioned forwardly of the vehicle and at a suitable height above the road surface to receive the said incident rays but it is preferred, due to the excellent protection afforded the detector unit, to mount the latter within the heavy protective bumper grill just below the headlights. In the latter location, the photoelectric detector will be subject more to direct incident rays from approaching vehicles rather than being possibly influenced and improperly actuated by side rays which may emanate from the lights of vehicles approaching along angularly intersecting side roads. Preferably, the unit 3 and the conductors 8 and 9 should be shielded against possible interference with proper functioning of the headlight control apparatus by the ignition system of the vehicle.

Specifically, the components included in the apparatus of my invention comprise a photoelectric detector of the electron multiplier type generally indicated by the reference numeral 14 and having therein a primary photoelectric cathode 16, arranged to receive incident light rays from the headlights of an approaching vehicle, a file of emission electron multiplier electrodes 18 arranged in a curvilinear path issuing from a point located adjacent the cathode 16 and terminating adjacent to a collector anode 17. As is well known in the art, the electrodes 16 and 18, with the exception of the collector anode 17 are each coated with electron-emissive deposits of salts of rare earth alkali metals chosen to produce increasing secondary emission for each primary electron impinging thereagainst after being initially released by the cathode 16. Associated with the photoelectric detector 14 is a power transformer 22 having a primary winding 23 connected to and to be energized by a suitable vibrator interrupter 24 powered from a current source 26 which may conveniently be the vehicle battery 12. The transformer 22 has one secondary winding 27 grounded at one end and has at its opposite end a high voltage output terminal 31. An additional secondary winding 32 is also provided in the transformer one end of which is grounded, the other high voltage end of which is connected to the photoelectron emission cathode 16, intermediate taps 33 being provided which are connected with the electron multiplier electrodes 18 so as to impose increasingly higher potentials on the electrodes 18 from the one proximate to the cathode 16 toward the collector anode 17. It will be seen that incident rays from the headlights of an approaching vehicle impinging on the cathode 16 will start a primary electron flow from the emission coating of the latter which, due to the high potential impressed on the first electrode 18, will be accelerated toward the latter to impinge thereagainst and to release a multiplication of secondary electrons which will in turn be attracted and accelerated toward the next in the series of electrodes 18 due to the superior potential of the latter. After impinging against the initial electrode 18 the group of secondary electrons will successively bounce along the file of electrodes 18 gathering secondary electrons at each step until the collector anode 17 is reached where the aggregate electron charge will be deposited.

Also forming part of the apparatus is a space discharge tube 34 of the gas-filled "Thyratron" type having an anode 36, connected through the actuating coil 37 of a relay 38 by a conductor 30 with the high potential terminal 31 of the power transformer 22, a secondary grid 39, a cathode 41 and a primary grid 42. A fixed condenser 40 of suitable value is shunted cross the relay actuating coil 37 so as to reduce flutter in the relay armature 35 which would otherwise be occasioned due to possible development of transient currents in the system. The cathode 41 is connected directly to ground which it will be noted is at positive potential, and is also connected with the heater or filament 43 energized by a current lead 44 which runs to the negative input terminal 46 of the vibrator and filter unit 24 supplying current impulses to the power transformer 22. The primary grid 42 is connected to one end of a fixed resistor 48 which, in series with a terminally grounded variable resistor 49, controls the degree of negative potential on the grid 42 in proportion to a given intensity of illumination impinging on the cathode 16. The collector anode 17 of the electron-multiplying photoelectric tube 14 is connected by a lead 51 with the mid-point terminal of the resistors 48 and 49 to thus connect the anode 17 with the grid 42 and a condenser 52 of suitable value is shunted across the variable resistor 49 so as to ground any R. F. transients which may develop in the photoelectric tube.

The relay 38, in addition to its current-conductive armature 35 which is mounted for swinging movement on the pivot terminal 53, is also provided with a similar armature 54 similarly mounted on a pivot terminal 56 and suitably linked with the armature 35 so as to be simultaneously and correspondingly moved therewith. The armature 35 is alternately engageable with separate contacts 57 and 58, being in normal engagement with the latter when the relay 37 is energized, while the armature 54 is likewise movable into conductive relation with contacts 59 and 61 and being engaged with the latter contact when the relay 37 is energized. Cooperative with the relay 38 is an additional relay 62 having an actuating coil 63 provided with a current conducting armature 64 which is swingable about a pivot terminal 66 and alternately engageable with contacts 67 and 68 being in normal engagement with the latter contact when the actuating coil 63 is deenergized. The relay 62 is provided for controlling the beam range and intensity of the vehicle headlights 69 which may be accomplished in a number of ways the one illustrated indicating the pivot terminal 66 connected by a lead 71 with the negative six volt lead 44 from the vehicle battery, the midpoint of the headlight filaments being both connected to ground through a conductor 72 and the high beam filaments 73 and low beam filaments 74 being connected in parallel respectively by current conductors 76 and 77 and further connected by leads 78 and 79 with the relay contacts 67 and 68.

The contact 57 of the relay 38 connects through a lead 81 with the grid 39 of the Thyratron tube, the said grid being also grounded through a resistor 82. A condenser 83 having one terminal thereof grounded through a lead 84 and the other terminal thereof connected through a lead 86 with the pivot terminal 53, is functionally cooperative with the resistor 82 as will be later explained. The relay contact 58 is connected with a conductor 87 with the six volt negative lead 44 as is also the pivot terminal 56 through the branch conductor 88. The contact 59 associated with the armature 54 is connected by a lead 89 with one terminal of the relay actuating coil 63, the other terminal of the relay being connected by a conductor 91 with one contact 92 of a thermally responsive switch 93 engageable by a bimetallic leaf element 94 anchored at the other end to a fixed terminal member 96 which is connected to ground. The relay contact 61 is connected through a lead 97 with one end of a heating coil 98 disposed in thermal radiation range of the bimetalllic leaf element 94, the other end of the coil 98 being connected with leads 99 and 101 connected with a resistor 102 and with the contact 92 of the switch 93 respectively, the other end of the resistor 102 being connected to ground.

The circuit arrangement of Figure 1, which comprises the preferred form of the invention, is shown with the component parts thereof in the operative positions assumed thereby when the vehicle in which the apparatus is included in travelling, with its long range headlight beams operating, along a road and is not confronted by an approaching vehicle. It will be seen that since no incident light rays are being intercepted by the photoelectric tube 14 no electron current will be generated thereby and consequently there will be no current flow to ground through the resistor 49. As as result of this both grids 39 and 42 of the Thyratron tube will be at ground potential so that the tube will fire each time that the voltage goes positive. Such substantially continuous firing of the tube 34 on the positive output pulses of the transformer 22, will energize the relay actuating coil 37 thus holding the interconnected armatures 35 and 54 in the positions shown. Under such conditions, the condenser 83 acquires a six volt negative charge from the battery lead 44 and the heating coil 98 of the bimetal switch is energized, receiving current from the lead 44 through the armature 54, the lead 97 and the resistor 102 to ground which is the positive side of the supply battery. Due to the fact that the heating coil 98 is in series with the resistor 102 a considerably lowered current will flow in the coil 98 which however will be sufficient to radiantly heat the bimetallic leaf element 94 and maintain the latter in a flexed condition wherein it will be disengaged from and out of conductive relation with the contact 92. Under these circuit conditions the headlight control relay 62 will be inactive due to lack of energization current in the coil 63 and consequently the headlights will be operating on high range beam as shown by the position of the armature 64.

When an oncoming vehicle is encountered the headlights of which are being operated on their long range beams, the light therefrom impinging on the photoelectric cathode 16 will institute the current flow on positive cycles from the tube 14 through the resistor 49 to ground. This will make the grid element 42 of the Thyratron tube negative with respect to ground with the result that the latter tube becomes non-conducting. When this occurs, the actuating coil 37 of the relay 38 is deenergized and the armatures 35 and 54 therefore move into engagement with the contacts 57 and 59 respectively. As soon as the armature 54 has moved to engage the contact 59 current flow from the lead 44 will be established in the headlight control relay coil 63 to ground. However since the resistor 102 is in series with this circuit, the current flow will be insufficient to actuate the relay armature 64 and consequently the headlights will remain on high beam for the aforementioned delay period to insure that the similar although possibly less sensitive similar control apparatus of the approaching vehicle will be properly excited. The extent of this delay period is governed by the time that it takes the heat flexed bimetallic element 94 to cool and engage the contact 92 at which time the current limiting resistor 102 will be short circuited and maximum six volt current will be passed through the coil 63 thus moving the armature 64 to drop the headlights to low beam. When this occurs in both vehicles, the light intensity on the photoelectric detector tubes of the respective control mechanisms will drop appreciably as will also the current output of the latter tubes. To counteract this and to prevent premature return of the headlights to high beam, the armature 35 on engaging the contact 57 causes the negatively charged condenser 83 to slowly discharge through the resistor 82 and thus place a negative bias on the grid element 39 to prevent firing of the tube 34. The time required for the charge of the condenser 83 to leak off is sufficient, at normal vehicle speeds, for the latter to approach each other to the point where the intensity of light on the photoelectric units from the lowered headlight beams of the vehicles will be sufficient to preserve the required negative bias on the grid element 42.

As soon as the vehicles have passed each other and no light enters the photoelectric tube, current flow from the latter and through the resistor 49 will cease. Also by this time the condenser 83 has discharged and as a result the grid element 39 as well as the grid element 42 will be at ground or positive potential. This permits the Thyratron tube 34 to resume firing on the positive half cycles of the transformer 22 and as a result, the relay coil 37 is again energized thus moving the armatures 35 and 54 into engagement with the contacts 58 and 61 respectively. This negatively charges the condenser 83 in readiness for the next cycle of operation and also closes the circuit through the heater coil 98. It will be recalled that during the interval when the headlights were operating on low beam, the heater coil 98 was deenergized and the bimetallic element 94 had cooled and engaged the contact 92 so as to place full operating current in the relay coil 63 in order to maintain the armature 64 in engagement with the contact 68. Due to the position of the bimetallic element 94, the resistor 102 will be short circuited out of the heater coil circuit thereby permitting the imposition of full current on the coil when the armature 54 engages the contact 61. This causes a very rapid heating and flexing of the element 94 with the result that engagement of the latter with the contact 92 is practically instantaneously broken thus reinserting the resistor 102 in the heater coil circuit and permitting the coil to subsequently operate at the aforesaid reduced current rate to maintain the thermally responsive switch open.

In Figure 3 is shown a modified circuit arrangement utilizing an additional Thyratron tube to secure the desired delayed action of the headlight control relay 62 after initial excitation of the photoelectric detector tube in order to insure proper excitation of the possibly less sensitive control apparatus of an approaching vehicle. As here shown most of the circuit components described in Figure 1 are retained with the exceptions that some circuit changes are involved, the tube 103 is substituted for the thermally responsive switch and a headlight control relay 62 having an actuating coil 104 responsive to the higher tube voltages rather than the lower battery voltage is employed. The contacts 58 and 61 of the relay 38 are interconnected by a lead 106 connected with the conductor 87 leading to the negative battery lead 44 while the contact 59 in this case is unused. The pivot terminal 56 of the armature 54 is connected by a lead 107 directly with the grid element 108 of the second Thyratron tube and is also connected with one end of a condenser 109 and a resistor 111 the opposite ends of the latter being each connected to ground. Power to operate the filament 112 and cathode 113 is derived by connecting one leg of the former to the lead 44 and grounding the opposite leg. The grid element 114 is connected intermediate a pair of biasing resistors 116 and 117 the former of which is connected to the positive ground while the latter of which is connected to the negative potential lead 44. The anode 118 of the tube 103 is connected by a lead 119 with the actuating coil 104, the other terminal of the coil being connected by a lead 121 with the conductor 30 leading to the high voltage terminal 31 of the transformer 22. Normally, the tube 103 is non-conducting due to the negative bias impressed on the grid element 108 by engagement of the relay armature 54 with the contact 61 and the negative current source 44. Thus the relay 62 will be deenergized and will be maintained in the high beam position. When the first Thyratron tube 34 ceases to fire upon initial energization of the photoelectric tube 14 the relay coil 37 will be deenergized thereby allowing the armatures 34 and 54 to swing into engagement with the contact 57 and the open contact 59 respectively. The relay 62 does not immediately act however due to the fact that the condenser 109 which carried a negative charge maintains a negative bias on the grid 108 of the second Thyratron which slowly leaks off the ground through the resistor 111. The time interval required for such current leak-off prior to the time when the grid element 108 reaches ground or positive potential and the second tube starts firing to energize the coil 104 and swing the armature 64 to the low beam position in engagement with the contact 68 represents the period intervening between initial excitation of the photoelectric tube 14 and the time that the high beams are diminished to take care of inferior sensitivity of the apparatus of the approaching vehicle, improper focusing of the headlights and other reasons which might interfere with efficient functioning of the apparatus. Operative concurrently with the aforesaid delay afforded by the second Thyratron tube is the additional delay previously described in connection with the circuit of Figure 1 wherein the negatively charged condenser 83 in being connected with the grid element 39 of the first Thyratron tube through the armature 35, the contact 57 and the lead 81, will maintain a negative potential on the said grid element which may gradually leak off to ground through the resistor 82. Thus the first Thyratron tube is prevented from firing, if other conditions should render this possible, until the vehicles have had time to relatively approach each other so that the light intensity on the photoelectric tube from the lowered headlight beams will be sufficient to maintain the required negative potential on the grid element 42.

From the foregoing description of my invention it will be seen that I have provided a selection of comparatively simple apparatus capable of affording a much greater range of sensitivity than comparative apparatus using conventional two element photoelectric detector devices, which is capable of maintaining a high degree of efficiency even though continued use might reduce the operational characteristics of the thermionic devices employed and which, by providing the desirable lag interval before the headlights are actually dimmed, eliminates the ultra-sensitiveness and liability to restore the head lights to ultimate brightness at unpredictable times inherent in many of the previously-proposed devices of this character.

I claim:

1. In apparatus for controlling multi-range beams of a vehicle's headlights, photoelectric detector means arranged to be excited by projected illumination from an approaching vehicle, a thermionic tube including a biased control grid connected with and capable of responding to current output of said photoelectric detector means, relay means connected with and to be actuated by current output of said thermionic tube, and said relay means being connected to said headlights to depress the long range beams thereof at the expiration of a prescribed time interval after initial excitation of said photoelectric detector means, and means for increasing the output current of said detector means in relation to the current resulting from said illumination excitement.

2. In apparatus for controlling multi-range beams of a vehicle's headlights, photoelectric detector means arranged to be excited by light rays from an approaching vehicle and including amplifying means for increasing the output current of said photoelectric means in relation to the current resulting from initial excitation, a thermionic tube including a biased control grid connected with and capable of responding to current output of said photoelectric detector means, a relay having actuating means connected with and to respond to current flow in the anode circuit of said thermionic tube, said relay being arranged to alternately control the long range beams of said headlights and to impose grid bias in said thermionic tube, and said imposed grid bias delaying operation of said relay for a prescribed interval after initial excitation of said photoelectric detector means.

3. In apparatus for controlling multi-range beams of a vehicle's headlights, photoelectric detector means including a main cathode capable of emitting primary electrons when exposed to incident rays from the headlights of an approaching vehicle and at least one auxiliary cathode capable of emitting secondary electrons when bombarded by primary electrons from the main cathode so as to increase the current output of said photoelectric detector means, a thermionic tube including a biased control grid connected to be energized by the current output of said photoelectric detector means to control current flow through said thermionic tube, cooperative power sources for energizing said photoelectric detector means and said thermionic tube, separate relay means arranged respectively for alternate connection with said vehicle headlights and with said control grid for respectively controlling the long range beams of said headlights and for altering bias characteristics of said control grid, one of said relay means including delayed action means operatively connected with and to govern current flow through said thermionic tube, and actuating means in one of said relay means and responsive to current flow in the anode circuit of said thermionic tube for operating said relay connected with said vehicle headlights.

4. In apparatus for controlling multi-range range beams of a vehicle's headlights, photoelectric detector means including a main cathode capable of emitting primary electrons when exposed to incident rays from the headlights of an approaching vehicle and a plurality of auxiliary cathodes capable of emitting increasing numbers of secondary electrons when subjected to bombardment by electrons from an adjacent cathode and instituted by primary electron emission from said main cathode so as to increase the current output of said photoelectric detector means, a power source operatively connected with said cathodes to energize the latter, a thermionic tube including a control grid connected with and to be energized by current output of said photoelectric detector means and further including an anode, an actuating coil in circuit with said anode and to be influenced by current flow in said thermionic tube, a relay including switch contacts operatively connected, respectively, to control the long range beams of said headlights and with said control electrode to govern grid bias in said thermionic tube, and delayed action means associated with said thermionic tube to operate said actuating coil a prescribed interval of time after initial energization of said photoelectric detector means.

5. In apparatus for controlling multi-range beams of a vehicle's headlights, photoelectric detector means including a main cathode capable of emitting primary electrons when exposed to incident rays from the headlights of an approaching vehicle and a plurality of auxiliary cathodes capable of emitting increasing members of secondary electrons when subjected to bombardment by electrons from an adjacent cathode and instituted by primary electron emission from said main cathode so as to increase the current output of said photoelectric detector means, a thermionic tube including a first grid element connected in circuit with and to be bias controlled by current output of said photoelectric detector means, a first relay including an actuating coil in said anode circuit and to be energized by current flow therein, a second relay including switch contacts operatively connected, respectively, with said headlights to control the long range and short range beams thereof, a switch arm connected with a source of potential and movable to alternately engage said switch contacts of the second relay, a delayed action element connected with and movable to operate said switch arm a predetermined interval of time after initial excitation of said photoelectric detector means, and second delayed action means associated with said operation of said first relay, said second delayed action being concurrent with said first delayed action and extending beyond the time interval of the latter.

6. In apparatus for controlling multi-range beams of a vehicle's headlights, photoelectric detector means including a main cathode capable of emitting primary electrons when exposed to incident rays from the headlights of an approaching vehicle and a plurality of auxiliary cathodes capable of emitting increasing numbers of secondary electrons when subjected to bombardment by electrons from an adjacent cathode and instituted by primary electron emission from said main cathode so as to increase the current output of said photoelectric detector means, a thermionic tube including a control grid connected in circuit with and to be energized by current output of said photoelectric detector means and further including an anode, a source of current connected with said anode and to energize said photoelectric detector means and said thermionic tube, a first relay in said anode circuit and to be energized by current flow therein, a second relay including switch contacts operatively connected, respectively, with said headlights to control the long range beams thereof, a switch arm connected with said current source and movable to alternately engage said switch contacts, a heat-deformable member connected to control said second relay at a predetermined interval after initial excitation of said photoelectric detector means, a heating coil disposed adjacent and to deform said member, and said heating coil being connected with and to be operated by said first relay.

7. In apparatus for controlling multi-range beams of a vehicle's headlights, photoelectric detector means including a main cathode capable of emitting primary electrons when exposed to incident rays from the headlights of an approaching vehicle and a plurality of auxiliary cathodes capable of emitting increasing numbers of secondary electrons when subjected to bombardment by electrons from an adjacent cathode and instituted by primary electron emission from said main cathode so as to increase the current output of said photoelectric detector means, a thermionic tube including a first control grid, a second control grid and an anode, said first control grid being connected in circuit with and to be energized by current output of said photoelectric detector means, a current source for energizing said photoelectric detector means, and said thermionic tube, a first relay, including switch contacts operatively connected, respectively, with said second control grid of said current source, said first relay also being connected with a capacity-resistance circuit connectable successively with said negative potential of the current source and with said second control grid to apply thereto an attenuating bias, a second relay connected with said headlights and to govern the high range beams thereof, an actuating coil associated with said first relay and connected in and to be energized by the anode circuit of said thermionic tube, an actuating coil associated with said second relay, contacts closable by said first relay and connected with said current source and the actuating coil of the second relay to energize the latter coil, heat responsive means associated with the actuating coil of said second relay for resisting operation of the latter by current flow in the anode circuit of said thermionic tube, and means controlled by said heat responsive means for actuating said second relay a predetermined interval of time after operation of said first relay.

8. In apparatus for controlling multi-range beams of a vehicle's headlights, photoelectric detector means including a main cathode capable of emitting primary electrons when exposed to incident rays from the headlights of an approaching vehicle and a plurality of auxiliary cathodes capable of emitting increasing numbers of secondary electrons when subjected to bombardment by electrons from an adjacent cathode and instituted by primary electron emission from said main cathode so as to increase the current output of said photoelectric detector means, a thermionic tube including a first control grid connected in circuit with and to be energized by current output of said photoelectric detector means, and also including a second control grid and an anode, a power source connected with and to energize said photoelectric detector means and thermionic tube, a first relay having an actuating coil in circuit with said anode and connected with said power source, said first relay having armature members and cooperative contacts engageable by said actuating coil, a second relay having an actuating coil cooperative with an armature and contacts connected with and to control the high range beams of said vehicle's headlights, said actuating coil of the second relay being connected with a contact of a first group thereof of the first relay which includes a first armature, said first armature being connected to said power source, a resistor connected with the actuating coil of the second relay for limiting current flow through the coil upon closing of the armature and a contact of said first group to resist movement of the armature of the second relay, a normally open heat flexible switch element shunted across said resistor and including a heating coil connected with a contact of said first group thereof and with said power source, said heating coil being disengageable from said power source upon breaking of the latter contact to cool said switch element and to shunt out said resistor so as to place full power of said source across the actuating coil of the second relay and to condition the latter to drive the long range beams of said vehicle's headlights, and a second group of contacts associated with said first relay and connected respectively with the second control grid of the thermionic tube, with a resistor-condenser delay circuit and with negative potential of said power source, and operable upon actuation of said first relay by excitation of said photoelectric detector means to introduce bias in said thermionic tube to resist return of said first relay to initial condition.

9. In apparatus for controlling multi-range beams of a vehicle's headlights, photoelectric detector means including a main cathode capable of emitting primary electrons when exposed to incident rays from the headlights of an approaching vehicle and a plurality of auxiliary cathodes capable of emitting increasing numbers of secondary electrons from an adjacent cathode and instituted by primary electron emission from said main cathode so as to increase the current output of said photoelectric detector means, a first thermionic tube including a control grid connected in circuit with and to be energized by current output of said photoelectric detector means and also including a second control grid and an anode, a power source connected with and to energize said photoelectric detector means and said first thermionic tube, said first thermionic tube being suitably biased as to be normally conductive in the absence of current output by said photoelectric detector means, a first relay connected in the anode circuit of said first thermionic tube and energized by current flow therein, a second relay connected with and to control the high range beams of said vehicle's headlights, a second thermionic tube having an anode circuit including the actuating coil of said second relay, said second thermionic tube having control grids biased to normally render the latter tube non-conducting in the absence of output current in said photoelectric detector means, and separate resistance-capacitance circuits associated with the control grids of the first and second thermionic tubes controllable by said first relay and operable respectively to impose an attenuating bias in said second thermionic tube to delay operation of said second relay after initial excitation of said photoelectric detector means and to introduce similar attenuating bias in said first thermionic tube to resist return of said first relay to initial condition.

LAWRENCE M. SILVA.

REFERENCES CITED

The following references are of record in the file of this patent:

UNITED STATES PATENTS

| Number | Name | Date |
| --- | --- | --- |
| 2,380,486 | Willis, Jr. | July 31, 1945 |
| 2,476,389 | Schmidt, Jr. | July 19, 1949 |
| 2,493,308 | Moore et al. | Jan. 3, 1950 |